US011046107B2

(12) United States Patent
Gourdin et al.

(10) Patent No.: US 11,046,107 B2
(45) Date of Patent: Jun. 29, 2021

(54) ACTINIC RADIATION CURED POLYURETHANE COATING FOR DECORATIVE SURFACE COVERINGS

(71) Applicant: Tarkett GDL S.A., Lentzweiler (LU)

(72) Inventors: Diego Gourdin, Wiltz (LU); Dominique Robert, Wiltz (LU); Richard Peres, Bastogne (BE); Jean-Yves Simon, Wiltz (LU)

(73) Assignee: Tarkett GDL S.A., Lentzweiler (LU)

( * ) Notice: Subject to any disclaimer, the term of this patent is extended or adjusted under 35 U.S.C. 154(b) by 28 days.

(21) Appl. No.: 15/304,923

(22) PCT Filed: Apr. 9, 2015

(86) PCT No.: PCT/EP2015/057699
§ 371 (c)(1),
(2) Date: Oct. 18, 2016

(87) PCT Pub. No.: WO2015/158595
PCT Pub. Date: Oct. 22, 2015

(65) Prior Publication Data
US 2017/0197459 A1 Jul. 13, 2017

(30) Foreign Application Priority Data

Apr. 18, 2014 (EP) ..................................... 14165308

(51) Int. Cl.
| | | |
|---|---|---|
| *B44C 5/04* | (2006.01) | |
| *C09D 175/14* | (2006.01) | |
| *E04F 15/10* | (2006.01) | |
| *B32B 27/30* | (2006.01) | |
| *B32B 27/22* | (2006.01) | |
| *B32B 27/08* | (2006.01) | |
| *B32B 27/40* | (2006.01) | |
| *B05D 3/06* | (2006.01) | |
| *B05D 3/12* | (2006.01) | |
| *B05D 7/04* | (2006.01) | |
| *B05D 7/26* | (2006.01) | |
| *B44C 1/24* | (2006.01) | |
| *E04F 13/18* | (2006.01) | |

(52) U.S. Cl.
CPC .............. *B44C 5/0461* (2013.01); *B05D 3/06* (2013.01); *B05D 3/12* (2013.01); *B05D 7/04* (2013.01); *B05D 7/26* (2013.01); *B32B 27/08* (2013.01); *B32B 27/22* (2013.01); *B32B 27/304* (2013.01); *B32B 27/40* (2013.01); *B44C 1/24* (2013.01); *C09D 175/14* (2013.01); *E04F 13/18* (2013.01); *E04F 15/105* (2013.01); *B32B 2255/10* (2013.01); *B32B 2255/26* (2013.01); *B32B 2307/728* (2013.01); *B32B 2471/00* (2013.01); *B32B 2607/02* (2013.01)

(58) Field of Classification Search
CPC ... C09D 175/16; C09D 127/06; E04F 15/105; E04F 15/107; E04F 13/18; B05D 3/06; B32B 3/30; B32B 27/16; B32B 27/308; B32B 27/40; B32B 27/304; B32B 27/22; B32B 27/08; B32B 7/12; B32B 2307/554; B32B 2255/10; B32B 2255/26; B32B 2607/02; B32B 2471/00
See application file for complete search history.

(56) References Cited

U.S. PATENT DOCUMENTS

| | | | |
|---|---|---|---|
| 4,100,318 A | 7/1978 | McCann et al. | |
| 4,373,187 A | 7/1983 | Boba et al. | |
| 4,393,187 A | 7/1983 | Boba et al. | |
| 4,598,009 A | 7/1986 | Christie et al. | |
| 5,543,232 A | 8/1996 | Ehrhart et al. | |
| 6,586,108 B1 | 7/2003 | Courtoy et al. | |
| 7,741,395 B2 | 6/2010 | Holt et al. | |
| 2002/0127372 A1* | 9/2002 | Waite ..................... | B32B 23/08 428/172 |
| 2003/0108718 A1* | 6/2003 | Simon ..................... | B29C 44/06 428/172 |
| 2003/0129362 A1* | 7/2003 | Simon ..................... | B29C 44/06 428/172 |
| 2003/0148126 A1* | 8/2003 | Tian ....................... | C08G 63/08 428/480 |
| 2010/0009076 A1* | 1/2010 | Walther ................. | C08G 18/10 427/204 |
| 2010/0298477 A1* | 11/2010 | Godwin .................. | C08K 5/10 524/285 |

(Continued)

FOREIGN PATENT DOCUMENTS

| | | |
|---|---|---|
| CN | 103242742 A | 8/2013 |
| DE | 4421559 A1 | 12/1995 |

(Continued)

OTHER PUBLICATIONS

PVC.org—Plasticizers, https://web.archive.org/web/20120724133742/http://www.pvc.org/en/p/plasticisers (Year: 2012).*

(Continued)

*Primary Examiner* — Michael Zhang
(74) *Attorney, Agent, or Firm* — Reinhart Boerner Van Deuren P.C.

(57) ABSTRACT

The present invention is related to decorative surface coverings, in particular floor or wall coverings, exhibiting low VOC emission, comprising one or more adjacent plasticized polyvinyl chloride layers and a polyurethane top-layer, said top-layer being obtained from the actinic irradiation of an aqueous ethylenically unsaturated polyurethane dispersion after evaporation of the water part. The decorative surface coverings comprise a mechanical embossed textured and/or patterned structure.

21 Claims, No Drawings

(56) References Cited

U.S. PATENT DOCUMENTS

| | | | |
|---|---|---|---|
| 2011/0040001 A1* | 2/2011 | Gosse | C08K 5/12 524/285 |
| 2011/0059262 A1* | 3/2011 | Lockhart | C08G 18/0823 427/508 |
| 2011/0112244 A1* | 5/2011 | Van Holen | C08F 283/006 524/591 |
| 2013/0216839 A1* | 8/2013 | Jendoubi | B32B 27/08 428/424.6 |
| 2013/0230729 A1 | 9/2013 | Tian et al. | |
| 2014/0128533 A1* | 5/2014 | Vanmeulder | C08F 2/46 524/507 |

FOREIGN PATENT DOCUMENTS

| | | |
|---|---|---|
| EP | 0 210 620 A2 | 2/1987 |
| EP | 1 164 149 A1 | 12/2001 |
| EP | 2 300 511 B1 | 1/2012 |
| EP | 2 316 867 B1 | 5/2012 |
| EP | 2657308 A1 * 10/2013 ............... C09D 4/06 |
| FR | 2 379 323 A1 | 9/1978 |
| JP | H06279566 A | 10/1994 |
| JP | H062379566 A | 10/1994 |
| WO | WO 97/01665 A1 | 1/1997 |
| WO | WO 03/022552 A1 | 3/2003 |
| WO | WO 2006/101433 A1 | 9/2006 |
| WO | WO 2012/048747 A1 | 4/2012 |

OTHER PUBLICATIONS

Database WPI; Week 201325; Aug. 14, 2013 (Aug. 14, 2013); Thomas Scientific, London, GB; AN 2013-U52308; XP002731906; 2 pages.

* cited by examiner

ACTINIC RADIATION CURED POLYURETHANE COATING FOR DECORATIVE SURFACE COVERINGS

FIELD OF THE INVENTION

The present invention is related to polyvinyl chloride based decorative floor and wall coverings comprising a barrier top-layer obtained from curing radiation curable polyurethane dispersions. The invention is further related to a method for the production of said surface coverings.

STATE OF THE ART

Polyvinyl chloride flooring products are usually prepared from plastisols. Most plastisols for vinyl flooring products are formulated using polyvinyl chloride (PVC) emulsion resins mixed with primary and secondary plasticizers, extenders, stabilizers and other additives. After being applied to a substrate, for example by spread coating, the layer of plastisol is fused and gelled by heating to an elevated temperature.

Thermoplastic layers made from polyvinyl chloride (PVC) plastisols show various limitations and disadvantages, such as insufficient gloss retention, insufficient wear and abrasion resistance, stain resistance, scuff resistance, and resistance to various chemical agents among others.

A method to remedy these shortcomings consists in the application of a coating, obtained from thermal and/or radiation cure of a liquid composition of monomers and/or polymers, as the outermost surface layer on polyvinyl chloride (PVC) layer.

U.S. Pat. No. 6,586,108 discloses a flooring material or a wall covering coated with a wear layer that is a heat-cured and radiation-cured coating composition, the composition including a polyvinyl chloride resin, an acrylic or methacrylic compound, and a radiation-reactive urethane oligomer, the composition being substantially or completely free of internal or external plasticizers. The thickness of the cured layer depends on its intended application. For single wear layers for flooring materials the coating thickness most preferable is about 250μ.

FR 2,379,323 discloses a top coat composition that contains, additionally to the usual polyurethane polymers, an ethylenically unsaturated compound. After being applied to a foamable substrate but prior to being thermally cured, the composition is irradiated with U.V. light or an ionizing radiation or is heated to a low temperature by infrared radiation. This causes polymerization of the ethylenically unsaturated compound, which increases the hot melt viscosity of the composition and changes it to a solid state. The partially crosslinked composition creates a high temperature melt flow barrier film that prevents the escape of gases from the foamed underlayer when the latter is fused at a high temperature. The ethylenically unsaturated compounds used for this purpose are all very expensive monomers.

U.S. Pat. No. 4,393,187 discloses a polyurethane coating which is essentially one macromolecule of homogeneous structure wherein the nitrogen atoms of the urethane groups are joined to alicyclic rings and/or straight aliphatic chains and the main polyurethane chains are crosslinked by three types of crosslinkages: 1) via isocyanate residues and triol or tetrol residues, reactive upon curing by exposure to heat; 2) via double bonds in vinyl compounds reactive, upon curing by exposure to radiation, with acrylo groups incorporated as acrylate esters into the polyurethane structures; and 3) via urea groups formed by action of moisture upon isocyanate groups which are unreacted in the heat and radiation curing steps. One particularly suitable substrate is resilient, foamed, embossed polyvinyl chloride yard goods such as used for floor covering.

JPH 06279566 discloses a composition especially useful for coating a PVC flooring material. The composition comprises (A) an adduct of an unsaturated monobasic acid with a poly adduct of an aromatic epoxy resin and (B) a (meth) acrylic ester having in the molecule an aliphatic ring containing a crosslinkage. Examples of the ester (B) include isobornyl (meth)acrylate, dicyclopentenyl (meth)acrylate, and dicyclopentenyloxyethyl (meth)acrylate. This composition is applied to a PVC substrate and then irradiated with actinic rays.

U.S. Pat. No. 4,100,318 discloses a process for producing a cushioned sheet goods product comprising the steps of: A) coating a substrate with a flexible foamable vinyl composition and heating to gel the foamable composition, B) applying a decorative pattern to the surface of the gelled coating, C) coating a clear vinyl overlay over the decorative pattern, and passing through a high temperature oven to fuse the clear vinyl overlay and expand the foam to the required thickness, D) cooling the sheet surface to a temperature which permits bonding with an actinic radiation curable coating, E) applying an actinic radiation curable coating composition which is essentially solvent free and comprises at least one organic compound having at least two photopolymerizable ethylenically unsaturated groups per molecule and capable of curing upon exposure to actinic radiation to form a continuous coating, F) exposing the thus coated sheet to actinic radiation until such coating has set, whereby the stain resistance, scratch and scuff resistance, abrasion resistance and gloss retention properties are enhanced by adding the actinic radiation curable coating. The actinic radiation cured coating contains polar groups such as urethane, ethers, esters, amides, epoxies and combinations thereof.

U.S. Pat. No. 5,543,232 discloses a floor covering comprising a wear layer, the wear layer including a resin composition comprising a (meth)acrylated polyester, the polyester being the reaction product of a diol and an aromatic tricarboxylic acid or anhydride, the diol being in excess of the aromatic tricarboxylic acid or anhydride on an equivalent basis, the reaction product of the diol and the acid or anhydride being (meth)acrylated.

Upon UV curing flexible coatings are produced that have good gloss retention and stain resistance.

US 2013/0230729 discloses a coating, comprising a biobased component including urethane acrylate, vinyl ether, or polyester acrylate. The coating composition includes at least about 5% by weight of renewable or biobased content.

The coating composition is radiation curable, formed by acrylating a biobased polyol acrylate, and reacting the biobased polyol acrylate with polyisocyanate to form a biobased resin. The floor product includes a substrate such as linoleum and resilient sheet among others.

DE 4421559 discloses a process for the production of a textured or patterned substrate comprising applying a primer to the substrate and lacquering the primed substrate with a lacquer which can be crosslinked by radiation. The lacquer is then partly crosslinked, a structure (texturing or graining) is applied in the surface of the partly-crosslinked lacquer, and the crosslinking of the lacquer is then completed by subjecting it to radiation. The substrate may also be decorated, in which case the decor is applied to the primed substrate before the lacquer is applied. The radiation may be in the form of an electron beam or may be ultra-violet for the partial stage.

EP 0210620 discloses a process for the production of a film having a textured lacquer coating, in particular a hot-embossing film, consisting of a support film, at least one textured lacquer coating and an adhesive coating, in which process a curable lacquer coating is, after application to the support film, only partially cured or dried and the partially cured or dried lacquer is then provided, in a stroke type or roller process, with a three-dimensional pattern (texturing), after which the lacquer coating provided with the texturing is completely cured, both the partial and the complete curing of the curable lacquer being affected by electromagnetic radiation, characterized in that a lacquer which contains two photoinitiators activatable at different wavelengths of electromagnetic radiation, in particular UV radiation, is used for the curable lacquer coating, one of said photoinitiators initiating the partial curing and the other the complete curing of the curable lacquer coating.

CN 103242742 discloses a waterborne photocurable coating used for protecting PVC coiled material flooring. The coating comprises 20-40% by weight of waterborne polyurethane resin, 25-50% by weight of bifunctional acrylate, 3-10% by weight of a photoinitiator, 1-20% by weight of filler and 1-5% by weight of an additive. A flat, tough, wear-resistant, weather-resistant, stain-resistant, non-yellowing, environment-friendly, odorless and pollution-free film is obtained after the waterborne photocurable coating is subjected to irradiation of ultraviolet rays with specific wavelengths.

U.S. Pat. No. 4,598,009 discloses a method for producing an embossed material which comprises the steps of: (a) applying to a substrate an embossable and crosslinkable coating comprising a linear polyurethane in combination with a photoinitiator that is effective in crosslinking the polyurethane upon exposure to actinic radiation, said linear polyurethane containing unsaturated sites only in the polymeric backbone thereof; (b) embossing the coating to thereby form a desired pattern thereon; and (c) irradiating the embossed coating with actinic radiation to thereby crosslink the polyurethane coating and permanently fix the embossed pattern.

WO 03/022552 discloses a process of forming an embossed coated substrate comprising the steps of: (I) forming on a substrate at least one coating whose composition comprises a radiation-curable polyurethane dispersion, (II) embossing the coated substrate on a relief surface, (III) irradiating the embossed coated substrate to cure the polyurethane-containing coating. The radiation-curable polyurethane dispersion is coated on paper. After water flash-off, embossing is carried out at a temperature between 60 and 220° C. After embossing the caul paper is wound and stacked at room temperature. UV-curing then can be carried out at any given time. Since the coated caul paper is intended as a release paper, adhesion of the cured polyurethane coating should be as low as possible.

Plasticizers conventionally used for PVC compositions include dialkyl phthalates, for example dioctyl phthalate. These conventional plasticizers have proven unsatisfactory for various reasons, one of which is that they have a tendency to migrate to the surface and exude from the surface.

Recently, the requirements placed upon the plasticizers have become more stringent with respect to performance and non-toxicity to humans and the environment. The use of phthalates is subject to continuously increasing restriction deriving from legal requirements.

There thus is a need either for a phthalate-free replacement of the phthalate ester plasticizers or for means preventing the phthalate ester plasticizers to migrate to and exude from the surface.

Replacing phthalate based plasticizers by phthalate-free plasticizers is already subject to a number of technical publications and patent literature. Yet the products obtained from processing these phthalate-free plastisols do not present a sufficiently reduced volatile organic compound release.

Migration of plasticizers to the surface and exudation from the surface may be reduced by applying a coating on the PVC layer. For embossed PVC based surface coverings, embossing may be performed before or after conversion of the coating composition into a crosslinked network.

When the coating composition is cured after embossing, the monomer and/or polymer composition applied on the PVC layer in general has a too low viscosity at the temperature of embossing so that it flows into the embossed valleys resulting in a heterogeneous coating thickness with an increased thickness in the valleys and a reduced thickness at the peaks. Where the resulting coating thickness is too thin, migration of the plasticizer to the surface and exudation from the surface will be insufficiently prevented. Since the average thickness of the coating is largely dictated by its final cost, heterogeneity of the coating thickness may result in a moderate to poor barrier.

AIMS OF THE INVENTION

The present invention aims to provide decorative floor and wall coverings, in particular those obtained from fusing and gelling phthalate comprising plastisols, substantially free of plasticizer migration and exudation and exhibiting a low volatile organic compound (VOC) release. A further aim of the present invention is to provide a process for the production of such surface coverings.

SUMMARY OF THE INVENTION

The present invention discloses a decorative surface covering, in particular floor or wall covering, exhibiting (i.e. with, having, presenting, or showing) low VOC emission, said surface covering comprising one or more adjacent plasticized polyvinyl chloride layers and a polyurethane top-layer comprising anionic or cationic salt groups, characterized in that said surface covering comprises a mechanical embossed textured and/or patterned structure.

Preferred embodiments of the present invention disclose one or more of the following features:
said decorative surface covering is characterized by a total volatile organic compound (TVOC) emission lower than 100 μg·m$^{-3}$, measured after 28 days in accordance with ISO 16000-6, ISO 16000-9 or ISO 16000-10;
said decorative surface covering is characterized in that the sum of the total volatile organic compound emission (TVOC), semi-volatile organic compound emission (SVOC) and formaldehyde emission is lower than 10 μg·m$^{-3}$, measured after 28 days in accordance with ISO 16000-6, ISO 16000-9 or ISO 16000-10;—said decorative surface covering is characterized in that one or more polyvinyl chloride layers comprise 100 parts of polyvinyl chloride and 5 to 250 parts of one or more plasticizers;
said decorative surface covering is characterized in that the polyurethane top-layer is obtained from radiation curing of an aqueous radiation curable polyurethane dispersion comprising 20 to 80% by weight, preferably 25 to 60% by weight of radiation curable compounds, said compounds comprising at least one ethylenically unsaturated polyurethane resin and optionally one or more reactive diluent(s), and from 0.5 to 8% by weight, preferably from 2 to 5% by weight, relative to the radiation curable compounds, of at least one photoinitiator;

the ethylenically unsaturated polyurethane of the aqueous radiation curable polyurethane dispersion is prepared from the reaction of:
  a) at least one polyisocyanate,
  b) at least one hydrophilic compound containing at least one reactive group capable to react with isocyanate groups and at least one group which is capable to render the polyurethane dispersible in aqueous medium either directly or after a reaction with a neutralizing agent to provide a salt,
  c) at least one polymerizable ethylenically unsaturated compound containing at least one reactive group capable to react with isocyanate groups and
  d) at least one compound which differs from compound (c) containing at least one reactive group capable to react with isocyanate groups;

component d) of the ethylenically unsaturated polyurethane, comprises an oligomeric or polymeric polyester having a weight average molecular weight comprised between 300 and 4000 g·mol$^{-1}$, preferable between 500 and 2500 g·mol$^{-1}$.

The present invention further discloses a process for the preparation of said decorative surface covering comprising the steps of:
  I. supplying a backing layer;
  II. contacting the backing layer with a plastisol composition comprising polyvinyl chloride and one or more plasticizers;
  III. fusing and gelling said plastisol composition;
  IV. applying the aqueous radiation curable polyurethane dispersion;
  V. evaporating water from the aqueous polyurethane dispersion;
  VI. embossing the polyvinyl chloride layer comprising the uncured ethylenically unsaturated polyurethane resin;
  VII. irradiating the ethylenically unsaturated polyurethane resin.

Preferred embodiments of the process for the preparation of said decorative surface covering disclose one or more of the following features:
  step (II) comprises more than one adjacent plastisol layer and fusing and gelling in step (III) is performed after application of each separate plastisol layer or after application of all the plastisol layers;
  the one or more adjacent plastisol layers are fused and gelled in step (III) at a temperature comprised between 130° C. and 200° C.;
  the aqueous curable polyurethane dispersion is applied in step (IV) at a temperature comprised between 25° C. and 60° C. and preferably between 30° C. and 50° C.;
  the mechanical embossing in step (VI) is performed at a surface temperature comprised between 130° C. and 200° C.;
  the dried coating is irradiated in step (VII) at a temperature comprised between 20° C. and 70° C.

DETAILED DESCRIPTION OF THE INVENTION

The object of the present invention is to provide polyvinyl chloride based decorative floor and wall coverings exhibiting (i.e. with, having, presenting, or showing) a reduced VOC release, said VOC release being preferably below 100 µg·m$^{-3}$, more preferably below 10 µg·m$^{-3}$, measured after 28 days according to ISO 16000-9 or ISO 16000-10.

The object of the present invention is to have said reduced VOC release from embossed PVC floor and wall coverings obtained from gelling and fusing of plastisols, in particular plastisols comprising phthalate based plasticizers.

We now have surprisingly found that said reduced VOC release is obtained from decorative (embossed) floor and wall coverings having a polyurethane top-layer, said polyurethane top-layer being obtained from radiation curable polyurethane dispersions.

More particularly, in the present invention, an homogeneous polyurethane top-layer is obtained from (radiation curing of) radiation curable polyurethane dispersions.

In the present invention, said polyurethane top-layer comprises anionic or cationic salt groups.

We have found that the use of radiation curable polyurethane dispersions allows for a very efficient VOC release barrier independent on whether these dispersions are applied before or after embossing.

The invention is yet of particular interest for decorative surface coverings where homogeneous polyurethane top-layer is obtained from the application of the radiation curable polyurethane dispersion before embossing and the radiation curing of the ethylenically unsaturated resins after embossing.

The decorative surface coverings of the present invention comprise one or more PVC layers, obtained from fusing and gelling of plastisols, and a polyurethane layer, obtained from the radiation curing of an aqueous radiation curable polyurethane dispersion, atop.

The decorative surface coverings of the invention comprise a mechanical embossed textured and/or patterned structure.

A plastisol is a fluid or a paste consisting of a mixture of polyvinyl chloride and a plasticizer optionally containing various additives. A plastisol is used to produce layers of polyvinyl chloride which are then fused to articles of flexible polyvinyl chloride. Plastisols typically contain 15 to 200 parts of a plasticizer blend per 100 parts of polyvinyl chloride, said blend comprising from 5 to 190 parts of one or more particular primary plasticizers and from 1 to 100 parts of one or more particular secondary plasticizers.

The plastisols of the present invention may comprise one or more phthalate based and/or phthalate-free primary plasticizers and one or more secondary plasticizers.

Phthalate based primary plasticizers for being used in the plastisols of the present invention are phthalic acid esters, preferably selected from the group consisting of di-(2-ethylhexyl) phthalate, diisononyl phthalate, dibutyl phthalate, diisodecyl phthalate, di-n-octyl phthalate and benzyl butyl phthalate.

Phthalate-free primary plasticizes for being used in the plastisols of the present invention are selected from the group consisting of the alkyl esters of cyclohexane dicarboxylic acids, the dialkyl esters of aliphatic dicarboxylic acids and the alkyl esters of aromatic di-, tri-, or tetra-carboxylic acids, with the exception of orthophthalic acid.

Secondary plasticizers for being used in the plastisols of the present invention are preferably selected from the group consisting of the lower alkyl esters of isophthalic and terephthalic acid, benzoates, citrates, phosphates, and sulfonates.

The plastisol of the present invention preferably comprises from 10 to 160 parts, more preferably from 15 to 130 parts, most preferably from 15 to 75 parts of one or more phthalate based and/or phthalate-free primary plasticizers and from 3 to 80 parts, more preferably from 5 to 60 parts, most preferably 10 to 50 parts of one or more secondary plasticizers per 100 parts of polyvinyl chloride.

Polyvinyl chloride used in the plastisols of the present invention is produced by emulsion polymerization or micro-suspension polymerization.

Typical suspension polymerized polyvinyl chloride consists of agglomerated particles of a size in the range of 80 to 200 μm (80 to 200 microns). Polyvinyl chloride of particle size between 1 and 40 μm (1 and 40 microns) may be produced by micro-suspension polymerization.

Typically, the agglomerated particles of emulsion polyvinyl chloride have a particle size in the range of 15 to 20 μm (15 to 20 microns).

Different forms of polyvinyl chloride are used in different applications. One important property is the mean molecular weight of the polymer. A factor known as the "K value" is used to indicate the mean molecular weight of polyvinyl chloride. The K value is the viscosity of a 0.005% by weight solution of the polyvinyl chloride in cyclohexanone at 25° C. as measured using an Ubbelhode viscometer. The K value is the German standard DIN 53726.

The K value of the polyvinyl chloride impacts the fusion temperature and gelation rate of the plasticized polyvinyl chloride composition. Typically the higher the K value the better the mechanical properties but the lower the flowability.

Emulsion and micro-suspension polymerized polyvinyl chloride are preferred for applications where good flow of the plasticized polyvinyl chloride is required such as spread coating, as used in the manufacture of floor or wall covering. For spread coating a K value 65 to 90 is preferred.

The plastisols of the present invention further comprises up to 250 parts of fillers, up to 7 parts of stabilizers, up to 5 parts epoxidized vegetable oils and up to 100 parts of other components selected from the group consisting of viscosity reducers, blowing agents, liquid kickers, antistatic agents, fire retardants, dyes, pigments, lubricants and processing aids.

Illustrative examples of fillers are calcium carbonate, clays, calcium silicate, talc, calcium sulfate, calcium oxide, magnesium oxide, titanium oxide, zinc oxide, aluminosilicates, dolomite, bauxite and silica, diatomaceous earth and molecular sieves.

Examples of stabilizers are benzotriazole and benzophenone compounds to reduce the degradation by sunlight and stabilizers to provide stability during heat processing which are typically metal compounds, particularly lead salts, organotin compounds, barium, cadmium and zinc salts and calcium/zinc stabilizers.

Examples of epoxidized vegetable oils are epoxidized soya bean oil, sunflower oil, linseed oil, corn oil rubber seed oil, neem oil and mee oil. The epoxidized vegetable oils may be mixed into the plastisol composition as plasticizer providing heat and light stability.

Examples of viscosity reducing agents are aliphatic hydrocarbons such as Viscobyk® 4010, 4013, 4015 and 4040, carboxylic acid derivates such as Viscobyk®5025, 5125 and 5050, Jayflex® 615 or Exxsol® D100, dodecyl benzene such as Jayflex® 602, specialty esters based on oleates and laurates, 2,2,4-trimethylpentanediol diisobutyrate, C3 to C17 esters of 1,2,4-trimethyl-1,3-pentanediol, C3 to C17 esters of 1,2,4-trimethyl-1,3-pentanediol monoisobutyrate and mixtures thereof, such as disclosed in U.S. Pat. No. 7,741,395.

Examples of blowing agents include azodicarbonamide, oxybisbenzenesulfonyl-hydrazide, azobisisobutyronitrile, toluenesulfonylhydra-zide, sodium bicarbonate and citric acid which release for example nitrogen and carbon dioxide and water when heated.

Examples of kickers include lead compounds such as dibasic lead phthalate, zinc oxide or barium/cadmium compounds. Kickers control and lower the decomposition temperature of the blowing agent.

Examples of antistatic agents are cationic, non-ionic or anionic in nature and generally are selected from the group consisting of amides and amines, quaternary ammonium compounds, polyalkylene glycol derivatives, sulphates and sulphonates, and miscellaneous ethers and esters.

Typical examples of antistatic agents are lauramidopropyl-trimethylammonium methosulfate, myristamidopropyl-trimethylammonium methosulfate, stearamidopropyl-trimethylammonium methosulfate and stearamidopropyl-dimethyl-beta-hydroxy-ethylammonium dihydrogen phosphate. The antistatic agents reduce build-up of static charges and to promote charge dissipation in their products.

Examples of fire retardants that can be used in the phthalate-free plastisol compositions of the present invention include halogen containing compounds and phosphorous containing organic compounds such as triaryl, trialkyl or alkyl diaryl phosphate esters. Other materials that may be used include chloroparaffins, aluminum trihydrate or antimony oxides.

The fire retardants are admixed to the compositions of the present invention in order to increase ignition time, reduce flame spreading and rate of burning.

A variety of dyes and pigments can be utilised in the plastisol compositions of the invention. Examples of useful pigments and dyes are: metallic oxides such as ironoxide, metal hydroxides, metal powders, sulphides, sulphates, carbonates, silicates such as ammoniumsilicate, carbon black, china clay, barytes, iron blues, lead blues, organic reds, organic maroons and the like.

Examples of lubricants and processing aids that can be used in the phthalate-free plastisol compositions of the present invention include stearic acid, metal stearates, petroleum waxes, silicon oil, mineral oil, synthetic oils and polyethylene waxes The plastisol compositions of the present invention are prepared using any convenient method known to the one skilled in the art. In general the finely divided PVC polymer and optionally other finely divided solid materials are dispersed in the liquid plasticizer blend forming a paste. On heating the dispersion to a temperature above 100° C., the polymer becomes soluble in the plasticizer whereupon the two phase dispersion is transformed into a single phase system.

Typically PVC plastisols are produced in batch processes using high shear mixing equipment. The mixing generally is performed for a period of from (about) 15 to (about) 60 minutes, whereupon the blend is cooled down. In general such process is used for making plastisols which are immediately further processed, since the high friction level of the mixing elements in the plastisol results in high local temperature increase which generally results in poor viscosity stability of the plastisol on storage.

On the other hand, storage stable plastisols can be prepared by blending the finely divided PVC polymer, optionally other finely divided solid materials, liquid plasticizer blend and optionally other liquid materials in a blending tank with low shear. The pre-homogenized plastisol is recirculated from the blending tank through a dynamic mixer back into the blending tank. This recirculation is performed up to 10 times prior to discharging the final plastisol.

The radiation curable aqueous polyurethane dispersion for use within the context of this invention preferably are selected from those as disclosed in for example EP 2300511 B1, EP 2316867 B1 and WO 2006/101433.

The radiation curable aqueous polyurethane dispersion for being used in the present invention in general is obtained from the reaction of
a) at least one polyisocyanate,
b) at least one hydrophilic compound containing at least one reactive group capable to react with isocyanate groups and at least one group which is capable to render the polyurethane dispersible in aqueous medium either directly or after a reaction with a neutralizing agent to provide a salt,
c) at least one polymerizable ethylenically unsaturated compound containing at least one reactive group capable to react with isocyanate groups and
d) at least one compound which differs from compound (c) containing at least one reactive group capable to react with isocyanate groups.

By polyisocyanate compound (a) is meant to designate organic compounds comprising at least two isocyanate groups. The polyisocyanate compound usually comprises not more than three isocyanate groups. The polyisocyanate compound (a) is most preferably a di-isocyanate. The polyisocyanate compound is generally selected from aliphatic, cycloaliphatic, aromatic and/or heterocyclic polyisocyanates or combinations thereof.

Examples of aliphatic and cycloaliphatic polyisocyanates are 1,6-diisocyanatohexane (HDI), 1,1'-methylene bis[4-isocyanatocyclohexane] (H12MDI), 5-isocyanato-1-isocyanatomethyl-1,3,3-trimethyl-cyclohexane (isophorone diisocyanate, IPDI). Aliphatic polyisocyanates containing more than two isocyanate groups are for example the derivatives of above mentioned diisocyanates like 1,6-diisocyanatohexane biuret and isocyanurate. Examples of aromatic polyisocyanates are 1,4-diisocyanatobenzene (BDI), 2,4-diisocyanatotoluene (2,4-TDI), 2,6-diisocyanatotoluene (2,6-TDI), 1,1'-methylenebis[4-isocyanatobenzene] (MDI), xylylene diisocyanate (XDI), tetramethylxylylene diisocyanate (TMXDI), 1,5-naphtalene diisocyanate (NDI), tolidine diisocyanate (TODI) and p-phenylene diisocyanate (PPDI).

The hydrophilic compound (b) is generally a polyol or polyamine comprising a functional group that can exhibit an ionic or non-ionic hydrophilic nature. Preferably it is a polyol or polyamine containing one or more anionic salt groups, such as a carboxylate and sulfonate salt groups or acid groups which may be converted to an anionic salt group, such as carboxylic acid or sulfonic acid groups.

Preferred are hydroxycarboxylic acids represented by the general formula $(HO_xR(COOH)_y$ wherein R represents a straight or branched hydrocarbon residue having 1 to 12 carbon atoms, and x and y independently are integers from 1 to 3. Examples of these hydroxycarboxylic acids include citric acid, malic acid, lactic acid and tartaric acid. The most preferred hydroxycarboxylic acids are the alpha,alpha-dimethylolalkanoic acids, wherein $x=2$ and $y=1$ in the above general formula, such as for example, 2,2-dimethylolpropionic acid and 2,2-dimethylolbutanoic acid.

Alternatively a polyol containing one or more potentially cationic groups such as amine groups, which may be converted in ammonium salt groups such as for example N-methyldiethanolamine, can be used.

Polymerizable ethylenically unsaturated compound (c) in general have one or more reactive groups capable to react with isocyanate groups and at least one (meth)acrylated group.

Compounds (c) in general contain one or more unsaturated function such as acrylic or methacrylic group and essentially one nucleophilic function capable of reacting with isocyanate, such as a hydroxyl group. Preferred are (meth)acryloyl mono-hydroxy compounds, more particularly poly(meth)acryloyl mono-hydroxy compounds.

Useful compounds include the esterification products of aliphatic and/or aromatic polyols with (meth)acrylic acid having a residual average hydroxyl functionality of (about) 1. The partial esterification products of (meth)acrylic acid with tri-, tetra-, penta- or hexahydric polyols or mixtures thereof are preferred. In this context, it is also possible to use reaction products of such polyols with ethylene oxide and/or propylene oxide or mixtures thereof, or reaction products of such polyols with lactones, which add to these polyols in a ring-opening reaction. Examples of suitable lactones are gamma-butyrolactone and, in particular delta-valerolactone and epsilon-caprolactone. These modified or unmodified polyols are partly esterified with acrylic acid, methacrylic acid or mixtures thereof until the desired residual hydroxyl functionality is reached.

Particularly preferred are compounds comprising at least two (meth)acryl functions such as glycerol diacrylate, trimethylolpropane diacrylate, glycerol diacrylate, pentaerythritol triacrylate, ditrimethylolpropane triacrylate, dipentaerythritol pentaacrylate and their (poly)ethoxylated and/or (poly)propoxylated equivalents.

Other suitable compounds are the (meth)acrylic esters with linear and branched polyols in which at least one hydroxy functionality remains free, like hydroxyalkyl(meth)acrylates having 1 to 20 carbon atoms in the alkyl group. Preferred molecules in this category are hydroxyethyl (meth)acrylate, hydroxypropyl (meth)acrylate, hydroxybutyl (meth)acrylate.

Hydroxyl functional polyester (meth)acrylates, polyether (meth)acrylates, polyether-ester (meth)acrylates, polycarbonate (meth)acrylates and polyether carbonate (meth)acrylates, comprising at least one hydroxy functionality, can be used as well.

Compound (d), containing at least one reactive group capable to react with isocyanate groups, in general comprises monomeric mono- and/or polyols and/or mono- and/or polyamines.

The mono-, di- and/or triols are chosen from the group consisting of methanol, ethanol, 1-propanol, 1-butanol, 1-pentanol, 1-hexanol, 2-propanol, 2-butanol, 2-ethylhexanol, ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, 1,3-butylene glycol, 1,4-cyclohexanedimethanol, 1,6-hexanediol, 1,2- and 1,4-cyclohexanediol, hydrogenated bisphenol A (2,2-bis(4-hydroxycyclohexyl)propane), diols derived from dimer fatty acids, 2,2-dimethyl-3-hydroxypropionic acid (2,2-dimethyl-3-hydroxypropyl ester), glycerol, trimethylolethane, trimethylolpropane, trimethylolbutane and/or castor oil. Neopentyl glycol, 1,4-butanediol, 1,4-cyclohexanedimethanol, 1,6-hexanediol and/or trimethylolpropane are preferred.

Diamines are particularly chosen from the group of ethylenediamine, 1,6-hexamethylenediamine, isophoronediamine, 1,3- and 1,4-phenylenediamine, piperazine, 4,4'-diphenylmethanediamine, amino-functional polyethylene oxides, amino-functional polypropylene oxides (and hydrazine can be used as compound (d). Ethylenediamine is particularly preferred.

Compound (d) furthermore comprises oligomeric and/or polymeric hydroxy-functional compounds. These oligomeric and/or polymeric hydroxy-functional compounds are, for example, polyesters, polyethers, polyether-esters, polycarbonates, polyether carbonate polyols and polycarbonate polyesters having a functionality of from 1.0 to 3.0, in each case with a weight average molecular weight in the range of from 300 to 4,000, preferably 500 to 2,500 g·mol$^{-1}$. Hydroxyl functional polyesters are particularly preferred.

The polymerizable ethylenically unsaturated water dispersible polyurethane can be prepared in a one-step or in a multi-step process.

In the one step process compounds (a) to (d) are reacted in the presence of a bismuth or tin catalyst and an inhibitor for preventing the radical reaction of the ethylenically unsaturated groups, preferably under substantially anhydrous conditions and at a temperature between 20° C. and 130° C. until the reaction between the isocyanate groups and the isocyanate-reactive groups is substantially complete. The isocyanate content can be followed by titration with an amine.

The polymerizable ethylenically unsaturated water dispersible polyurethane is preferably obtained by a process comprising a first step comprising the reaction of a stoichiometric excess of compound (a) with compound (c), a second step comprising the reaction of the product of the first step with compound (b) and (d) and optionally a third step wherein the remaining free isocyanate groups provided by compound (a) are reacted to give allophanate groups.

The reactants are generally used in proportions corresponding to an equivalent ratio of isocyanate groups provided by compound (a) to isocyanate-reactive groups provided by compounds (b), (c) and (d) of from (about) 0.8:1 to (about) 2:1

The optional third step preferably takes place at high temperature, usually from 80° C. to 130° C.

In general, in a fourth step, the polyurethane obtained is dispersed in an aqueous medium by adding the polymer slowly into water or reversely by adding water to the polymer. Usually this dispersion proceeds under high sheer mixing. Usually the dispersion requires the preliminary neutralization of the hydrophilic groups provided by compound (b), such as the carboxylic acid or sulfonic acid groups, into anionic salts. This is generally done by adding a neutralizing agent to the polymer or the water.

Suitable neutralizing agents, for potentially anionic groups include ammonia, tertiary amines such as trimethylamine, triethylamine, triisopropylamine, tributylamine, N,N-dimethylcyclohexylamine, N,N-dimethylaniline, N-methylmorpholine, N-methylpiperazine, N-methylpyrrolidine and N-methylpiperidine and inorganic bases comprising monovalent metal cations, preferably alkali metals such as lithium, sodium and potassium and anions such as hydroxides, hydrides, carbonates and bicarbonates. Preferred are alkali metal hydroxides.

Suitable neutralizing agents for potentially cationic groups include acids chosen from the group of lactic acid, acetic acid, phosphoric acid, hydrochloric acid and/or sulfuric acid are preferably employed.

The total amount of these neutralizing agents can be calculated according to the total amount of acid groups to be neutralized.

The ethylenically unsaturated polyurethane generally has a double bond equivalent (number of milli-equivalents of ethylenic double bonds per gram of solid) of from 0.05 to 6 meq/g, preferably of from 1 to 3 meq/g.

In general the weight average molecular weight (Mw) of the ethylenically unsaturated polyurethane is between 1000 and 100000 g·mol$^{-1}$, preferably between 3000 and 80000 g·mol$^{-1}$, more preferably between 3000 and 60000 g·mol$^{-1}$.

The aqueous dispersion optionally contains reactive diluents containing at least one group which can undergo free radical polymerization. The reactive diluents are employed to the extent of 0 to 65% by weight of the ethylenically unsaturated polyurethane and the reactive diluents adding up to 100 weight percentage.

The reactive diluents may be added before the dispersion is made or after. Mostly addition before is preferred.

Reactive diluents are, for example, the alcohols methanol, ethanol, 1-propanol, 1-butanol, 1-pentanol, 1-hexanol, 2-propanol, 2-butanol, 2-ethylhexanol, dihydrodicyclopentadienol, tetrahydrofurfuryl alcohol, 3,3,5-trimethylhexanol, octanol, decanol, dodecanol, ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, 1,3-butylene glycol, 1,4-cyclohexanedimethanol, 1,6-hexanediol, 1,2- and 1,4-cyclohexanediol, hydrogenated bisphenol A (2,2-bis(4-hydroxycyclohexyl)propane), glycerol, trimethylolethane, trimethylolpropane, trimethylolbutane, pentaerythritol, ditrimethylolpropane, dipentaerythritol, sorbitol esterified completely with (meth)acrylic acid, and the ethoxylated and/or propoxylated derivatives of said alcohols esterified completely with (meth)acrylic acid and the technical grade mixtures obtained during (meth)acrylation of the abovementioned compounds.

Further suitable reactive diluents are for example epoxy (meth)acrylates, polyurethane (meth)acrylates, polyether (meth)acrylates, polyester (meth)acrylates and polycarbonate (meth)acrylates having a number average molecular weight preferable comprised between 500 and 10000 g·mol$^{-1}$.

The aqueous radiation curable composition in general contains from 20 to 80% by weight, preferably from 25 to 60% by weight of polyurethane and optional reactive diluent.

In a further aspect, the present invention refers to a coating composition, comprising at least one radiation curable aqueous polyurethane dispersion as disclosed above. Said composition may furthermore comprise additives, such as photoinitiators, curing accelerators, flow agents, wetting agents, antifoaming agents, levelling agents, matting agents, fillers and other customary coating auxiliaries.

The photoinitiators for being used in the coating formulation of the present invention are of the unimolecular (type I) or of the bimolecular type (type II).

Suitable (type I) systems are aromatic ketone compounds, such as e.g. benzophenones in combination with tertiary amines, alkylbenzophenones, 4,4'-bis(dimethylamino)benzophenone (Michler's ketone), anthrone and halogenated benzophenones or mixtures of the types mentioned.

(Type II) initiators, such as benzoin and its derivatives, benzil ketals, acylphosphine oxides, 2,4,6-trimethyl-benzoyl-diphenylphosphine oxide, bisacylphosphine oxides, phenylglyoxylic acid esters, camphorquinone, alpha-aminoalkylphenones, alpha,alpha-dialkoxyacetophenones and alpha-hydroxyalkylphenones, are furthermore suitable.

Photoinitiators which can easily be incorporated into aqueous coating compositions are preferred. Such products are, for example, Irgacure® 500 (a mixture of benzophenone and (1-hydroxycyclohexyl) phenyl ketone, Ciba, Lampertheim, DE), Irgacure® 819 DW (phenyl-bis-(2,4,6-trimethylbenzoyl)-phosphine oxide, Ciba, Lampertheim, DE), Esacure® KIP EM (oligo-[2-hydroxy-2-methyl-1-[4-(1-methylvinyl)-phenyl]-propanone], Lamberti, Aldizzate, Italy). Mixtures of these compounds can also be employed.

The coating composition according to the present invention comprises between 0.5 and 8% by weight, preferably between 2 and 5% by weight of photoinitiator which may comprise one or more photoinitiators. The amount of photoinitiators is relative to the ethylenically unsaturated group comprising compounds (polyurethane and optional reactive diluents)

The present invention provides a decorative surface covering more particularly floor and wall covering comprising a plasticized polyvinyl chloride layer and a polyurethane top-layer.

The present invention provides a decorative surface covering comprising one or more adjacent plasticized polyvinyl chloride layer(s) and a polyurethane top-layer. For a multilayer system these polyvinyl chloride layers typically include a foam layer, a decorative layer and a clear protective wear layer.

In a further embodiment the present invention provides a method for the preparation of a decorative surface covering comprising spreading out at least one plastisol layer on a backing layer and gelling said PVC plastisol layer at a temperature comprised between 130° C. and 200° C. Hereto, the at least one plastisol is spread on a backing layer moving at around 15 to 25 meters per minute.

For multilayer decorative surface coverings the PVC plastisol is spread on the backing layer in several layers so that the floor covering is literally built up.

The multilayer product is first gelled by contact with one or more heated roll(s) and then passed into an oven where they are gelled and fused at a temperature of from 130° C. to 200° C.

Often the gelling is performed after the spreading of each individual layer starting with the base layer. After the gelling the next layer can be spread.

After gelation of the decorative layer a design may be printed before the application of the protective wear layer.

The protective wear layer in general comprises a PVC layer obtained from gelation/fusion of a PVC plastisol.

When all layers have been spread, and gelled at a temperature comprised between 130° C. and 200° C., the product is passed into an oven to obtain full fusion of all layers together and adequate expansion of the foamed layers.

After gelling and fusing the at least one PVC plastisol composition, a radiation curable aqueous polyurethane dispersion is homogeneously applied on the decorative surface covering standing at a temperature comprised between 25 and 60° C., preferably between 30° C. and 50° C.

After evaporation of water, in a convection oven at (about) 100° C., the decorative surface covering comprising the polyurethane resin top-layer, standing at a temperature comprised between 130 and 200° C., first is mechanically embossed, then is subjected to actinic radiation, and finally is cooled down to (about) room temperature.

The radiation curable compositions of the present invention may be applied onto the PVC under-layer by any suitable coating process known to those of ordinary skill in the art, for example by direct gravure coating, reverse gravure coating, offset gravure coating, smooth roll coating, curtain coating, spray coating and combinations thereof. Direct gravure coating and smooth roll coating are preferred.

Mechanical embossing is performed by pressing a texture into the plasticized polyvinyl chloride layer comprising the ethylenically unsaturated polyurethane layer atop. Embossing is carried out at a pressure comprised between 10 and 25 kg·cm$^{-3}$ and surface temperature comprised between 130° C. and 200° C.

The apparatus for mechanically embossing a substrate in general includes a cooled embossing roller and a backup roller operatively positioned within the embossing roller such that a nip is formed between the backup roller and the embossing roller whereby the substrate may pass through the nip and engage the embossing roller for imparting a mechanically embossed pattern. The apparatus further includes a profilometer capable of quantifying the mechanically embossed pattern as the substrate is being embossed.

In general the texture obtained from mechanical embossing is characterized by a depth comprised between (about) 10 to 100 µm, a width comprised between (about) 125 to 400 µm, a wall angle (angle relative to surface) comprised between (about) 5 to 40 degrees and a frequency of (about) 4 to 20 features per cm.

After mechanical embossing the ethylenically unsaturated polyurethane resin, standing at a temperature comprised between 20 and 70° C. is crosslinked by exposure to actinic radiation such as ultraviolet (UV) radiation with a wavelength of for instance 250-600 nm.

Examples of radiation sources are medium and high-pressure mercury vapour lamps, lasers, pulsed lamps (flashlight), halogen lamps and excimer emitters.

Preferably, within the context of the present invention, one or more medium pressure mercury vapour UV radiators of at least 80 to 250 W/linear cm are used. Preferably said medium pressure mercury vapour UV radiator(s) is (are) positioned at a distance of from (about) 5 to 20 cm from the substrate. The irradiating time period preferably is comprised between 1 and 60 seconds for having a radiation dose in the range of from 80 to 3000 mJ/cm$^2$.

On the other hand the ethylenically unsaturated polyurethane layer can be cured by bombardment with high-energy electron beams (EB) at for instance 150-300 keV. For this particular case, coating formulations that do not comprise photoinitiators, are cured. From economical point of view electron-beam curing yet is less attractive.

In general the thickness of the polyurethane top coat is comprised between 3 and 30 µm (3 and 30 microns), preferable between 8 and 20 µm (8 and 20 microns).

The decorative surface covering thus obtained is characterized by an outstanding (or improved) wear and stain resistance and a significantly reduced VOC release (when compared to decorative surface coverings obtained by methods described in the art).

Examples

The following illustrative examples are merely meant to exemplify the present invention but are not destined to limit or otherwise define the scope of the present invention.

A phthalate based and a phthalate-free PVC plastisol formulation, according to the formulations as given in table 1, are prepared by applying the procedure as described in paragraphs 59 to 61.

TABLE 1

| | Component | Plastisol I | Plastisol (II) |
|---|---|---|---|
| PVC | Paste PVC micro-suspension | 100.00 | 70.00 |
| | Paste PVC resin extender | | 30.00 |
| Primary plasticizer | Diisononyl phthalate | 53.00 | |
| | Diisononyl cyclohexanoate | | 16.00 |
| Secondarry plasticizer | Isononyl benzoate | 11.00 | 7.00 |
| Diluant | Texanol isobutyrate | 9.00 | |
| | Branched paraffin | | 5.00 |
| Filler | Calcium carbonate | 160.00 | |
| Stabilizers | Liquid Ca/Zn | | 2.00 |
| | Epoxydized soya bean oil | | 2.50 |
| Other component | Air release | | 0.60 |
| | Blowing agent | 2.90 | |
| | Kicker | 1.70 | |

In table 1:

for Plastisol (I): the PVC resin micro-suspension is a blend of 59 parts of Vestolit® P1357 K from Vestolit and 41 parts of Lacovyl® PB 1156 from Arkema; diisononyl phthalate is Vestinol® 9 from Evonik; isononyl benzoate is Vestinol® INB from Evonik; Texanol isobutyrate is 2,2,4-trimethyl-1,3-pentanediol diisobutyrate from Eastman Chemical; calcium carbonate is Mikhart® 40 from Provençale; the blowing agent, azodicarbonamide, is Unifoam® Ultra 1035 from Hebron and the Kicker, zinc oxide, is Harzsiegel® 1001 from Norzinco.

for Plastisol (II): the PVC resin micro-suspension is a blend of 60.00 parts of Lacovyl® PB 1704 H and 10 parts of Lacovyl® PB 1202 from Arkema; the paste PVC resin extender is Vinnolit® EXT from Vinnolit; diisononyl cyclohexane is Hexamoll® DINCH from BASF; isononyl benzoate is Vestinol® INB from Evonik; the branched paraffin, including normal alkanes, isoalkanes and cyclics, is EXXSOM™ D100 from Exxon Mobil; liquid Ca/Zn stabilizer is Lankromark® LZC 393 from Akcros; epoxydized soya bean oil is Drapex® HSE from Galata Chemicals and air release additive is Byk® 3160 from Byk Chemie.

The polyvinyl chloride layers obtained after gelling/fusing at a temperature of 170° C. for a period of 30 seconds, at a thickness of (about) 200 micrometer are characterized by a TVOC emission after 28 days of more than 100 µg·m$^{-3}$.

VOC release measurement are performed according to ISO 16000, ISO 16000-6, ISO 16000-9 or ISO 16000-10.

Subsequently an aqueous ethylenically unsaturated polyurethane dispersion, answering the composition as given in table 2, is applied on the polyvinyl chloride layer, obtained from plastisol (I) and plastisol (II).

The coating is applied by a smooth roll coating process under conditions to have a dry coating thickness comprised between 10 and 12 µm.

TABLE 2

| | Coating Formulation (I) | Coating Formulation (II) |
|---|---|---|
| UV-PUD | 400 | 400 |
| pH stabilizer | 1.6 | 1.6 |
| Matting agent | 10 | 10 |
| Anti-foaming agent | 5 | 5 |
| Wetting agent | 5 | 5 |
| Photoinitiator | 10 | 10 |
| Reactive diluent | | 10 |
| water | 15 | 55 |

In table 2: the ultra-violet curable polyurethane dispersion is Bayhydrol® UV 2720/1 XP from Bayer characterized by a solid content of 40%; the pH stabilizer is AMP90™, 2-Amino-2-methyl-1-propanol, from DOW; the matting agent is a 4/1 mixture of Deuteron® MK from Deuteron and Acematt®TS 100 from Evonik; the anti-foaming agent is Neocryl AP 2861 from DSM Coating Resins; the wetting agent is Byk-348 from Byk Chemie; the photoinitiator is Irgacure® 2100 from Ciba Specialty Chemicals for Coating Formulation (I) and Esacure® KIP 100 F from Lamberti for Coating Formulation (II); the reactive diluent is SR 238 (HexaneDiolDiAcrylate) from Arkema used in Coating formulation (II) for dissolving the photoinitiator in order to have it properly dosed.

Coating Formulation (I) is applied on the PVC layer obtained from fusing and gelling of Plastisol (I); Coating Formulation (II) is applied on the PVC layer obtained from fusing and gelling of Plastisol (II). The radiation curable polyurethane dispersions are applied on the respective PVC layers, standing at (about) 50° C.

After evaporation of the water, in a convection oven at (about) 100° C., the PVC layer, comprising the uncured ethylenically unsaturated polyurethane resin, is mechanically embossed at a pressure of (about) 15 kg·cm$^{-3}$ while standing at a temperature of (about) 160° C. and subsequently subjected for 6 seconds to irradiation with ultraviolet light emitted by a 160 W/cm medium pressure mercury vapor UV-bulb (Fusion UV Systems Ltd) with a total UV dose of 1500 mJ/cm$^2$.

The decorative surface coverings of the present invention, comprising the crosslinked polyurethane top-layer, all are characterized in that the sum of TVOC, SVOC and formaldehyde emission after 28 days is less than 10 µg·m$^{-3}$.

The decorative surface coatings of the present invention furthermore prove an outstanding wear resistance, examined by a Taber' abrasion resistance test with CS-17 abrasive wheels under a load of 1 kg according to JIS K 7204 (good after 15000 revolutions) and stain resistance, examined according to EN 423 (not affected to very slightly affected depending on the chemical substance used).

The invention claimed is:

1. Decorative surface covering exhibiting low VOC emission, said surface covering comprising one or more adjacent plasticized polyvinyl chloride layers and a homogenous polyurethane top-layer comprising anionic or cationic salt groups, wherein said surface covering comprises a mechanical embossed textured and/or patterned structure and wherein the homogenous polyurethane top-layer is obtained from radiation curing of radiation curable polyurethane dispersions, wherein the polyurethane top-layer prevents plasticizer migration and exudation, and wherein the decorative surface covering has a total volatile organic compound (TVOC) emission lower than 100 µg·m−3, measured after 28 days in accordance with ISO 16000-6, ISO 16000-9 or ISO 16000-10.

2. Decorative surface covering according to claim 1 wherein the sum of the total volatile organic compound emission (TVOC), semi-volatile organic compound emission (SVOC) and formaldehyde emission is lower than 10 µg·m−3, measured after 28 days in accordance with ISO 16000-6, ISO 16000-9 or ISO 16000-10.

3. Decorative surface covering according to claim 1, wherein the one or more polyvinyl chloride layers comprise 100 parts of polyvinyl chloride and 5 to 250 parts of one or more plasticizers.

4. Decorative surface covering according claim 1, wherein the polyurethane top-layer is obtained from radiation curing of an aqueous radiation curable polyurethane dispersion comprising 20 to 80% by weight of radiation curable compounds, said compounds comprising at least one ethylenically unsaturated polyurethane resin and optionally one or more reactive diluent(s), and from 0.5 to 8% by weight relative to the radiation curable compounds, of at least one photoinitiator.

5. Decorative surface covering according to claim 4, wherein said ethylenically unsaturated polyurethane is prepared from the reaction of:
  a) at least one polyisocyanate,
  b) at least one hydrophilic compound containing at least one reactive group capable to react with isocyanate groups and at least one group which is capable to render the polyurethane dispersible in aqueous medium either directly or after a reaction with a neutralizing agent to provide a salt,
  c) at least one polymerizable ethylenically unsaturated compound containing at least one reactive group capable to react with isocyanate groups and
  d) at least one compound which differs from compound (c) containing at least one reactive group capable to react with isocyanate groups.

6. Decorative surface covering according to claim 5 wherein component d) of the ethylenically unsaturated polyurethane, comprises an oligomeric or polymeric polyester having a weight average molecular weight comprised between 300 and 4000 g·mol−1.

7. Decorative surface covering according to claim 5, wherein the ethylenically unsaturated polyurethane has weight average molecular weight of between 1000 and 100000 g·mol−1.

8. Decorative surface covering according to claim 1, wherein the decorative surface covering is a decorative wall covering.

9. Decorative surface covering according to claim 1, wherein the decorative surface covering is a decorative floor covering.

10. Decorative surface covering according to claim 1, wherein the one or more adjacent plasticized polyvinyl chloride layers are obtained from a plastisol composition comprising from 10 to 160 parts of one or more phthalate-free primary plasticizers and from 3 to 80 parts of one or more secondary plasticizers per 100 parts of polyvinyl chloride.

11. Decorative surface covering according to claim 1, wherein the one or more adjacent plasticized polyvinyl chloride layers consists of agglomerated particles of a size in the range of 80 to 200 µm.

12. Decorative surface covering according to claim 1, wherein the structure of the mechanical embossed textured and/or patterned structure is characterized by a depth comprised between 10 to 100 µm, a width comprised between 125 to 400 µm, a wall angle comprised between 5 to 40 degrees and a frequency of 4 to 20 features per cm, the wall angle being measured relative to the flat, unstructured, surface of the decorative surface covering, and the thickness of the polyurethane top-layer is comprised between 3 and 30 µm.

13. Decorative surface covering according to claim 1, wherein the homogeneous polyurethane top-layer is obtained from radiation curing of a radiation curable polyurethane dispersion after drying.

14. Decorative surface covering according to claim 1, wherein the mechanical embossed textured structure has a depth between 10 to 100 µm, a width between 125 to 400 µm, a wall angle between 5 to 40 degrees and a frequency of 4 to 20 features per cm.

15. Process for the preparation of the decorative surface covering according to claim 1, comprising the steps of:
  I. supplying a backing layer;
  II. contacting the backing layer with a plastisol layer made of a composition comprising polyvinyl chloride and one or more plasticizers;
  III. fusing and gelling said plastisol layer;
  IV. applying an aqueous radiation curable polyurethane dispersion comprising 20 to 80% by weight of radiation curable compounds, said compounds comprising at least one ethylenically unsaturated polyurethane resin and optionally one or more reactive diluent(s), and from 0.5 to 8% by weight relative to the radiation curable compounds, of at least one photoinitiator;
  V. evaporating water from the aqueous polyurethane dispersion;
  VI. embossing the polyvinyl chloride layer comprising the uncured ethylenically unsaturated polyurethane resin;
  VII. irradiating the ethylenically unsaturated polyurethane resin.

16. The process according to claim 15, wherein step (II) comprises more than one plastisol layer adjacent to one another, and wherein fusing and gelling in step (III) is performed after application of each separate plastisol layer or after application of all the plastisol layers.

17. The process according to claim 15, comprising fusing and gelling the plastisol layer in step (III) at a temperature comprised between 130° C. and 200° C.

18. The process according to claim 15, comprising applying the aqueous curable polyurethane dispersion in step (IV) at a temperature comprised between 30° C. and 50° C.

19. The process according to claim 15, comprising applying the aqueous curable polyurethane dispersion in step (IV) at a temperature comprised between 25° C. and 60° C.

20. The process according to claim 15, comprising performing mechanical embossing in step (VI) at a surface temperature comprised between 130° C. and 200° C.

21. The process according to claim 15, comprising irradiating the dried coating in step (VII) at a temperature comprised between 20° C. and 70° C.

* * * * *